United States Defensive Publication [19] (H) [11] T958,013

Ballard et al. [43] May 3, 1977

[54] POLYMERIC FILM

[75] Inventors: Denis George Harold Ballard; Eric Jones; John Christopher Padget, all of Runcorn, England

[73] Assignee: Imperial Chemical Industries Limited, London, England

[21] Appl. No.: 664,985

[22] Filed: Mar. 8, 1976

[30] Foreign Application Priority Data

Mar. 7, 1975 United Kingdom ..... 9562/75

[51] Int. Cl.[2] ..... B29C 17/02; C08F 10/08; C08F 10/04

[52] U.S. Cl. ..... 526/350; 264/95; 526/348

[57] ABSTRACT

A film formed from a copolyme of ethylene and at least one mono-α-olefine has a combination of impact strength and stiffness which is such that the function $$\frac{\text{Impact strength (g)}}{\text{Film thickness (microns)}} \times [\text{Stiffness Modulus } (MNm^{-2}) - 100]$$

is at least 750. The function is preferably at least 1000 and may be several thousands. The film may also have a high tear strength and good tensile strength.

The copolymer from which the film is formed is preferably one in which the comonomer contains at least 5 carbon atoms; the comonomer conveniently contains not more than 12 carbon atoms. The comonomer content of the polymer is typically in the range from 6.5 up to 30%, by weight.

The film can be produced by a tubular film technique using a temperature of 170°–300° C, a circumferential expansion of 1.2 to 10.0 times and a draw down of 2.5 to 50 times. The production of the polymeric film can include extruding the ethylene copolymer through an annular dye, maintaining the dye temperature in the range from 170°–300° C, blowing the exudate to give a circumferential expansion of from 1.2 up to 10.0 times and drawing the exudate to give a draw down of from 2.5 up to 50 times.

17 Claims, 1 Sheet Drawing,

25 Pages Specification

The file of this unexamined application may be inspected and copies thereof may be purchased (849 O.G. 1221, Apr. 9, 1968).

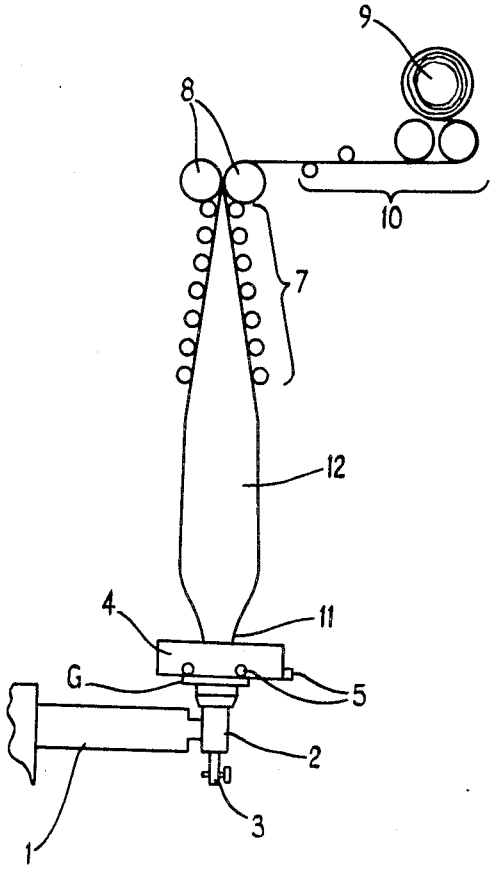

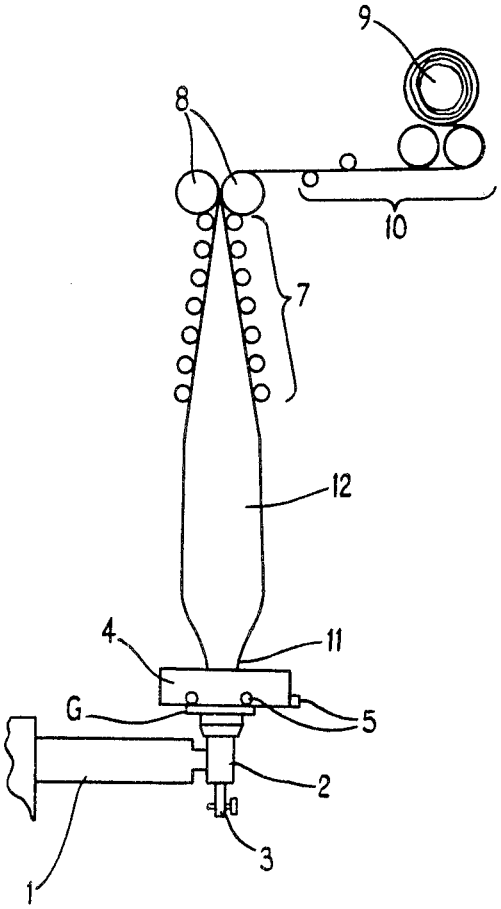
9
8
10
7
12
4
11
G
5
2
3
1